United States Patent
Battle et al.

(10) Patent No.: US 10,339,479 B2
(45) Date of Patent: Jul. 2, 2019

(54) DYNAMIC AGGREGATION OF DISPARATE ENTERPRISE DATA

(71) Applicant: International Business Machines Corporation, Armonk, NY (US)

(72) Inventors: James Battle, Bedford, MA (US); Krishnamohan Dantam, Chelmsford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 14/833,780

(22) Filed: Aug. 24, 2015

(65) Prior Publication Data

US 2015/0363729 A1    Dec. 17, 2015

Related U.S. Application Data

(63) Continuation-in-part of application No. 12/638,699, filed on Dec. 15, 2009, now abandoned.

(51) Int. Cl.
| | |
|---|---|
| *G06Q 10/06* | (2012.01) |
| *H04L 29/06* | (2006.01) |
| *G06Q 10/10* | (2012.01) |

(52) U.S. Cl.
CPC ....... *G06Q 10/06313* (2013.01); *G06Q 10/06* (2013.01); *G06Q 10/103* (2013.01); *H04L 63/0823* (2013.01)

(58) Field of Classification Search
CPC .................................................. G06Q 10/06
See application file for complete search history.

(56) References Cited

U.S. PATENT DOCUMENTS

| 6,963,826 | B2 | 11/2005 | Hanaman et al. | |
|---|---|---|---|---|
| 7,197,502 | B2 | 3/2007 | Feinsmith | |
| 2003/0208378 | A1 | 11/2003 | Thangaraj et al. | |
| 2005/0060324 | A1 | 3/2005 | Johnson et al. | |
| 2005/0278159 | A1 | 12/2005 | Krishnamurthy | |
| 2005/0278208 | A1* | 12/2005 | Schultz | G06Q 10/0631 705/7.12 |
| 2006/0235732 | A1 | 10/2006 | Miller et al. | |
| 2007/0006126 | A1* | 1/2007 | Calkins | G06Q 10/06 717/103 |

(Continued)

OTHER PUBLICATIONS

Papazoglou, Mike P; Van Den Heuvel, Willem-Jan; "Service-Oriented Architectures: Approaches, Technologies and Research Issues;" The VLDB Journal 2007; Mar. 3, 2007; pp. 389-415; Springer-Verlag 2007.

(Continued)

Primary Examiner — Kurtis Gills
(74) Attorney, Agent, or Firm — Gates & Cooper LLP

(57) ABSTRACT

Methods, systems, and computer program products for dynamically aggregating data from disparate sources. A computer implemented method involves initializing a scheduler application to create one or more intermediate tables. The intermediate tables are populated with automatically aggregated data from one or more disparate data sources. The data is governed by business rules in an enterprise system. The method further involves enabling access to a subset of the aggregated data in accordance with a user authorization credential.

17 Claims, 6 Drawing Sheets

(56) References Cited

U.S. PATENT DOCUMENTS

| | | | |
|---|---|---|---|
| 2007/0129976 A1* | 6/2007 | Hochberg | G06Q 10/06 705/7.12 |
| 2007/0156767 A1 | 7/2007 | Hoang et al. | |
| 2007/0226038 A1* | 9/2007 | Das | G06F 8/10 705/348 |
| 2007/0288289 A1 | 12/2007 | Motoyama et al. | |
| 2007/0288292 A1* | 12/2007 | Gauger | G06Q 10/00 405/9 |
| 2008/0084333 A1* | 4/2008 | Forrest | G06Q 10/06 340/989 |
| 2008/0127089 A1* | 5/2008 | Peretz | G06F 8/71 717/122 |
| 2008/0312979 A1 | 12/2008 | Lee et al. | |
| 2008/0313596 A1* | 12/2008 | Kreamer | G06F 8/20 717/101 |
| 2009/0024647 A1 | 1/2009 | Hein | |
| 2009/0164496 A1* | 6/2009 | Carnathan | G06F 17/30368 |
| 2009/0204465 A1* | 8/2009 | Pradhan | G06Q 10/06 705/7.17 |
| 2010/0057744 A1* | 3/2010 | Lock | G06F 17/30557 707/E17.032 |
| 2010/0305994 A1 | 12/2010 | Gaskell | |
| 2011/0035244 A1* | 2/2011 | Leary | G06Q 10/00 705/7.13 |
| 2011/0099255 A1 | 4/2011 | Srinivasan et al. | |
| 2011/0214050 A1* | 9/2011 | Stambaugh | G06F 3/04817 715/234 |

OTHER PUBLICATIONS

"Tool to Track Project Metrics-Earned Value by a Person"; IP.com/IBM TDB; Feb. 21, 2006.

Ives-et al.; "An XML Query Engine for Network-Bound Data"; ACM Digital Library; 2002.

USPTO Office Action dated Dec. 23, 2011 for parent U.S. Appl. No. 12/638,699.

USPTO Office Action dated Aug. 12, 2012 for parent U.S. Appl. No. 12/638,699.

USPTO Office Action dated Feb. 6, 2014 for parent U.S. Appl. No. 12/638,699.

USPTO Final Office Action dated May 21, 2012 for parent U.S. Appl. No. 12/638,699.

USPTO Final Office Action dated Feb. 24, 2015 for parent U.S. Appl. No. 12/638,699.

* cited by examiner

DYNAMIC AGGREGATION OF DISPARATE ENTERPRISE DATA

RELATED APPLICATION

This application is a continuation in part of U.S. patent application Ser. No. 12/638,699, entitled "Project Management," filed Dec. 15, 2009, the disclosure of which is incorporated by reference herein.

BACKGROUND

Enterprise resource planning ('ERP') is an information system designed to coordinate all the information and activities needed to complete business processes. An ERP system is based on a common database and a modular software design. An enterprise application may maintain various business process-related data in a database, such as schedule and planning data.

SUMMARY

Methods, systems, and computer program products for dynamically aggregating data from disparate sources are disclosed herein. Embodiments of the present disclosure provide a tool for project management, including project planning, which includes presenting disparate enterprise data collectively for a user and preserving business rules and security enforced in the enterprise system. In an first general embodiment, a computer implemented method involves initializing a scheduler application to create one or more intermediate tables. The intermediate tables are populated with automatically aggregated data from one or more disparate data sources. The data is governed by business rules in an enterprise system. The method further involves enabling access to a subset of the aggregated data in accordance with a user authorization credential.

Other general embodiments include a computer program product and a system for dynamically aggregating data from disparate sources including one or more data processing systems ('computers'). The data processing systems comprise a processor and a computer memory operatively coupled to the processor. The computer memory of one or more of the systems has disposed within it computer program instructions for execution on the processor to implement one or more of the method embodiments described above.

The foregoing and other objects, features and advantages of the disclosure will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
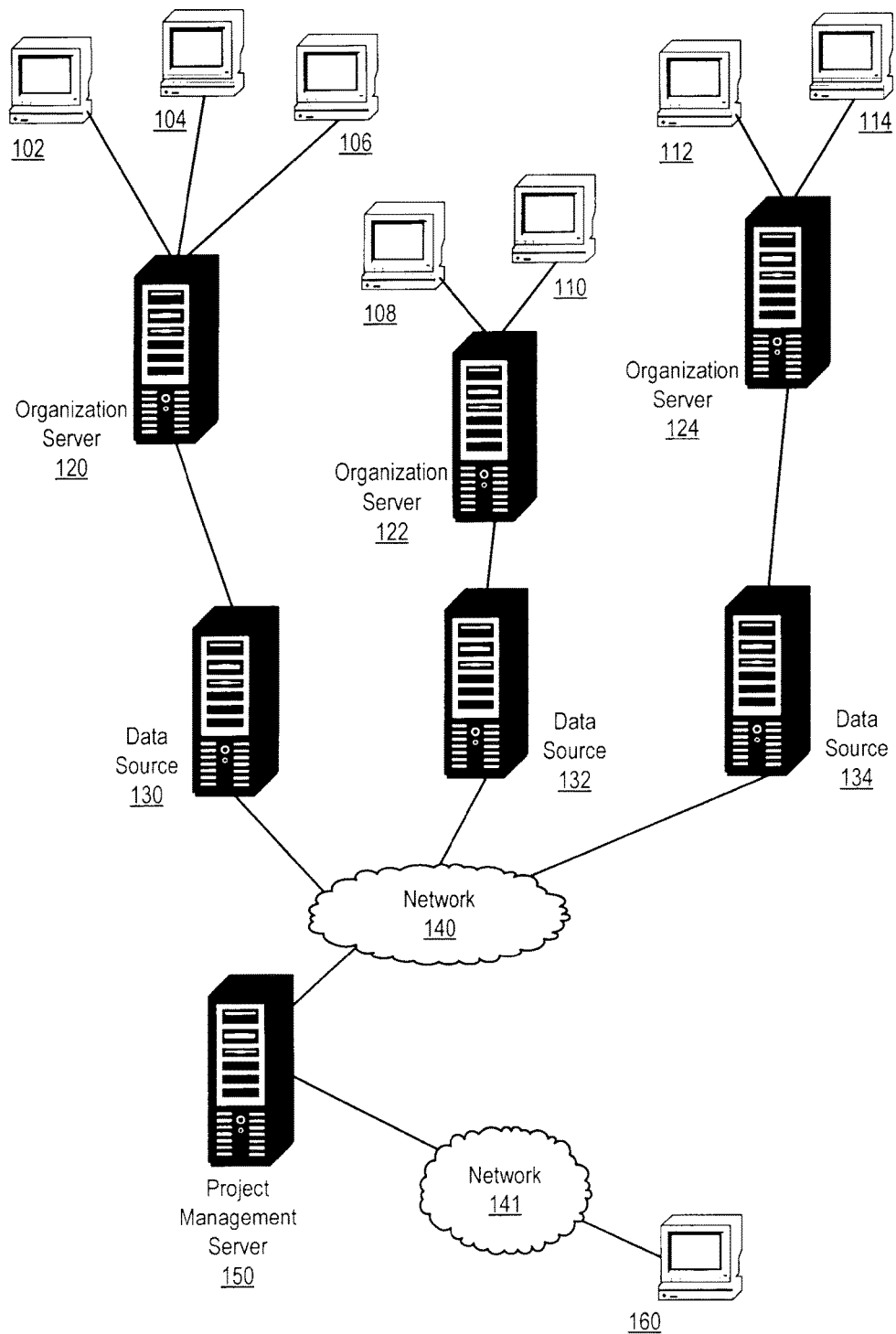
FIG. 1 illustrates a system for project management in accordance with one embodiment of the invention.

Exemplary methods, systems, and design structures for managing electronic messages according to embodiments of the present invention are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, components, acts, and equivalents of all means or step plus function elements in the claims below are intended to include any structure, material or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention may be implemented through various system architectures, such as a client-server architecture (locally or over the Internet), a web browser-web server architecture, and so on. Embodiments of the present disclosure include computer-implemented methods described below. In some embodiments, these methods may be carried out entirely on one apparatus or computer of the system. Alternatively, portions of the methods may be carried out on two or more computers connected by a network or a network device connecting the computers. The order of method elements as described herein does not necessarily limit the order in which the elements can be performed.

Embodiments of the present invention present disparate data stored in various database tables of an ERP system as a single project planning interface to manage a project. Current project management tools export disparate enterprise data to the external tool and manipulate the data within the tool. Thus, these tools manipulate the data outside of the ERP environment and without influence from the ERP system. Embodiments of the present invention preserve the ERP environment during presentation and manipulation.

FIG. 1 illustrates a system for project management in accordance with one embodiment of the invention. The system is an enterprise system, such as, for example, an enterprise asset management system. The enterprise system facilitates management of all the information and functions of an enterprise from shared data stores. The enterprise system generates and maintains data about the enterprise. For example, an enterprise asset management system maintains data about work orders, preventive maintenance schedule data, planned changes to systems, software releases that may be installed, and so on.

The system of FIG. 1 includes computers 102-114 providing data for a respective organization. This data may be received, recorded, or generated by the computers 102-114. Computers 102-114 may include, desktops, laptops, workstations, point-of-sale devices, industrial measurement devices, or any other computer which may provide enterprise data. The computers 102-114 transmit data to organization servers 120-124. The organization servers may be enterprise servers, such as, for example, Sun SPARC Enterprise M series servers, Power Servers from International Business Machines Corporation (Armonk, N.Y.), and the like. Computers 102-106 transmit data to organization server 120. Computers 108-110 transmit data to organization server 122. Computers 112-114 transmit data to organization server 124. Organization servers 120-124 store this data in data sources 130-134, respectively. Data sources 130-134 may be relational databases, non-relational databases (e.g., object-relational databases), or file systems. Data sources 130-134 may include storage devices such as tape libraries, redundant arrays of independent disks ('RAID arrays'), and so on. Data sources 130-134 may also include servers or other data processing systems appropriate for managing storage, which may run a database management system ('DBMS'), such as, for example, MySQL by Sun Microsystems, Oracle, Microsoft SQL Server, or DB2 from International Business Machines Corporation (Armonk, N.Y.). Data sources 130-134 may be implemented with Storage Area Networks ('SANs'), Network-Attached Storage ('NAS'), direct-attached storage ('DAS'), a SAN-NAS hybrid architecture, or other storage architectures.

The system further includes a project management server 150 coupled to data sources 130-134 through a network 140. Project management server 150 is also coupled to computer 160 through a network 141. Networks 140, 141 may include, alone or in combination, one or more local area networks ('LANs'), wide area networks ('WANs'), wired or cellular telephone networks, intranets, or the Internet. Networks 140 and 141 may be the same network. In the system of FIG. 1, project management server 150 and computer 160 execute computer-readable program instructions to provide a project planning interface for presenting disparate data stored in data sources 130-134 for manipulation in connection with project management.

Embodiments of the present invention include computer implemented methods operating on any of organization servers 120-124, data sources 130-134, project management server 150, and computer 160, alone or in combination. For example, organizational servers 120-124 may run an enterprise application that maintains various business processes-related schedule and planning data in data sources 130-134, which are databases. A project planning interface represents disparate data from disparate sources of an ERP system together to schedule and plan the activities. Computer 160 implements the project planning interface, either alone or in combination with project management server 150. Computer 160 and project management server 150 may operate according to a traditional client-server model, with a project management client running on computer 160 and a project management server application running on project management server 150. In other embodiments, project management server 150 may be a web server, and computer 160 may provide the interface through an Internet browser communicating with a web-based server application running on project management server 150. Specific embodiments may include various software architectures implementing system functionality depending upon the implementation of project management server 150 and computer 160, as described below with reference to FIG. 3.

The devices disclosed in FIG. 1 are provided for illustration and not for limitation. Embodiments of the invention could be implemented as any viable computing device including logic and memory, or software modules including computer program instructions executed thereon, as will occur to one of ordinary skill in the art, including devices where logic is implemented as field-programmable gate arrays ('FPGAs'), application-specific integrated circuits ('ASICs'), and the like.

Figure 2:
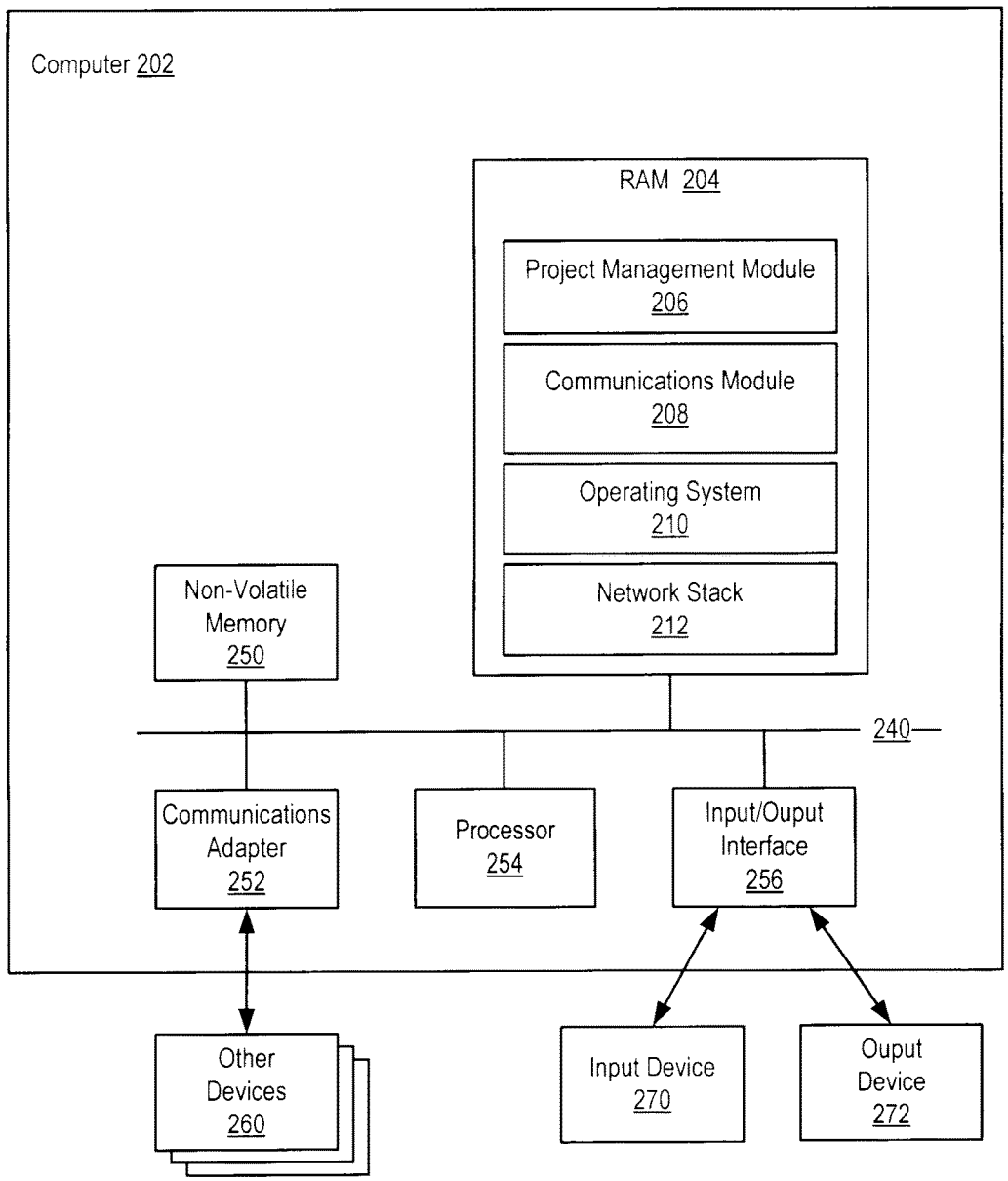
FIG. 2 sets forth a block diagram of a computer used in embodiments of the present disclosure.

Embodiments of the presently disclosed invention are implemented to some extent as software modules installed and running on one or more data processing systems ('computers'), such as servers, workstations, PCs, and the like. Each of computer 102-114, 160, server 120-124, 150, and data source 130-134 may be implemented as a computer. FIG. 2 sets forth a block diagram of an example computer used in embodiments of the present disclosure. Computer 202 includes at least one computer processor 254 as well as a computer memory, including both volatile random access memory ('RAM') 204 and some form or forms of non-volatile computer memory 250 such as a hard disk drive, an optical disk drive, or an electrically erasable programmable read-only memory space (also known as 'EEPROM' or 'Flash' memory). The computer memory is connected through a system bus 240 to the processor 254 and to other system components. Thus, the software modules are program instructions stored in computer memory.

An operating system 210 is stored in computer memory. Operating system 210 may be any appropriate operating system such as Windows XP, Windows Vista, Mac OS X, UNIX, LINUX, or AIX from International Business Machines Corporation (Armonk, N.Y.). A network stack 212 is also stored in memory. The network stack 212 is a software implementation of cooperating computer networking protocols to facilitate network communications.

Computer 202 also includes one or more input/output interface adapters 256. Input/output interface adapters 256 may implement user-oriented input/output through software drivers and computer hardware for controlling output to output devices 272 such computer display screens, as well as user input from input devices 270, such as keyboards and mice.

Computer 202 also includes a communications adapter 252 for implementing data communications with other devices 260. Communications adapter 252 implements the hardware level of data communications through which one computer sends data communications to another computer through a network.

Also stored in computer memory is a communications module 208. The communications module 208 may include device-specific computer program instructions for implementing electronic communications between project management server 150 and computer 160. Communications module 208 may be implemented, in part, as a web browser or client application running on a desktop or workstation operated by a user. Alternatively, communications module 208 may be implemented, in part, as a project management server 150 running web-based project management services or operating as an applications server. The communications module 208 functionality is different between different devices of FIG. 1, such as computer 160 and project management server 150.

Computer memory may also contain project management module 206. Project management module 206 may include computer program instructions for accepting a designation of disparate enterprise data from disparate sources in an enterprise system as plan data for a project; dynamically aggregating the plan data from the disparate data sources; presenting the aggregated plan data in a project planning interface; accepting a manipulation of the plan data; and/or enforcing the business rule on the plan data in the project planning interface. Project management module 206 may be implemented as one or more sub-modules operating in separate software layers or in the same layer. Although depicted as a separate module from the communications module 208, project management module 206 or one or more of the sub-modules may be incorporated as part of the communications module 208. In various embodiments, either project management module 206 or communications module 208 may be implemented in the software stack or in firmware.

Figure 3:
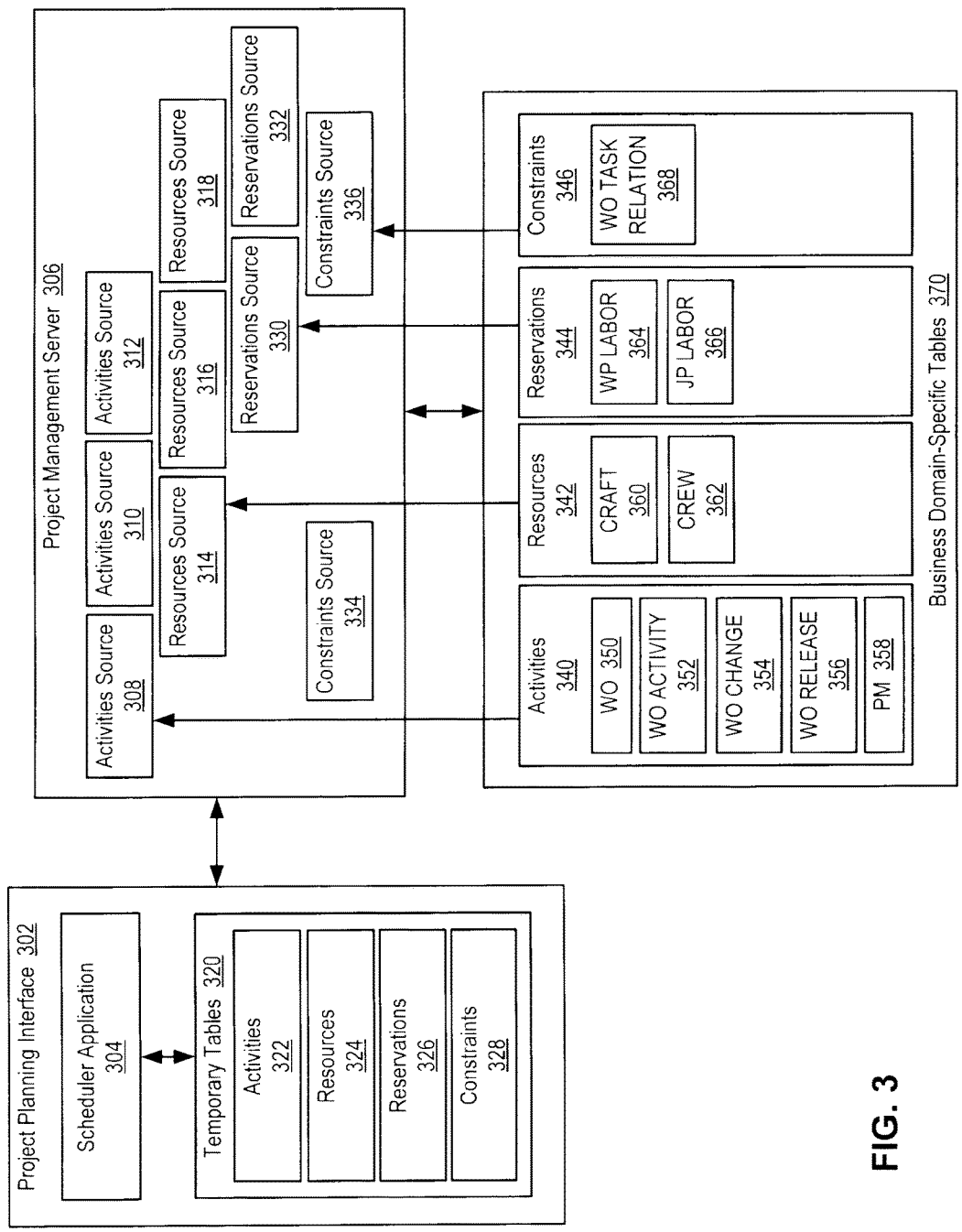
FIG. 3 sets forth a block diagram illustrating a software architecture in accordance with embodiments of the invention.

FIG. 3 sets forth a block diagram illustrating a software architecture in accordance with embodiments of the invention. The software architecture includes a project management server 306 which communicates with a project planning interface 302 and business domain-specific tables 370. The project management server 306 contains identified sources 308-318, 330-336. In some implementations, the sources may be identified by creating SQL queries.

Project planning interface 302 includes a scheduler application 304 which creates intermediate tables 320 upon initializing a schedule for a specific project. These intermediate tables 320 contain intermediate tables for activities 322, resources 324, reservations 326, and constraints. The intermediate tables depicted in FIG. 3 are for illustration and not limitation. Depending on the datasources that are used, project planning interface 302 may include additional intermediate tables, such as, for example, forecast data tables. For example, if preventive maintenance data (i.e., work performed at intervals) is included as one of the datasources, then one or more additional intermediate tables could be used to store the forecast data. The user may manipulate this forecast data from the scheduler application. In other embodiments, other project management interfaces may employ any intermediate tables for any set of datasources as will occur to those of skill in the art.

Upon initialization of the scheduler application 304, the project planning interface notifies the project management server 306. The project management server 306 retrieves data from the business domain-specific tables 370 according to the identified sources 308-318, 330-336. Some of this data obtained from the business domain-specific tables may not be directly needed for planning data, but may be additional data which may aid in planning. For example, activities source identification 308 identifies activities tables 340 in business domain-specific tables 370. Activities tables 340 include work orders 350, work order activity 352, work order changes 354, work order releases 356, and preventive maintenance records 358. Resources tables 342 include craft 360 and crew 362. Reservations tables 344 include job planning data and work planning data, which indicate the craft requirements for the job. For example, to do a particular task, the work requires two electricians. Constraints tables 346 include work order task relations 368.

The example business domain-specific tables 370 are for illustration and not for limitation. In other embodiments, the business domain-specific tables 370 may include tables for any type of data used in project management as will occur to those of skill in the art. The project management server 306 sends the retrieved data from the disparate sources to the project planning interface 302 to populate intermediate tables 320. After the initial population of the tables, the project management server 306 detects changes in business domain-specific tables 370 and communicates them to project planning interface 302.

Figure 4:
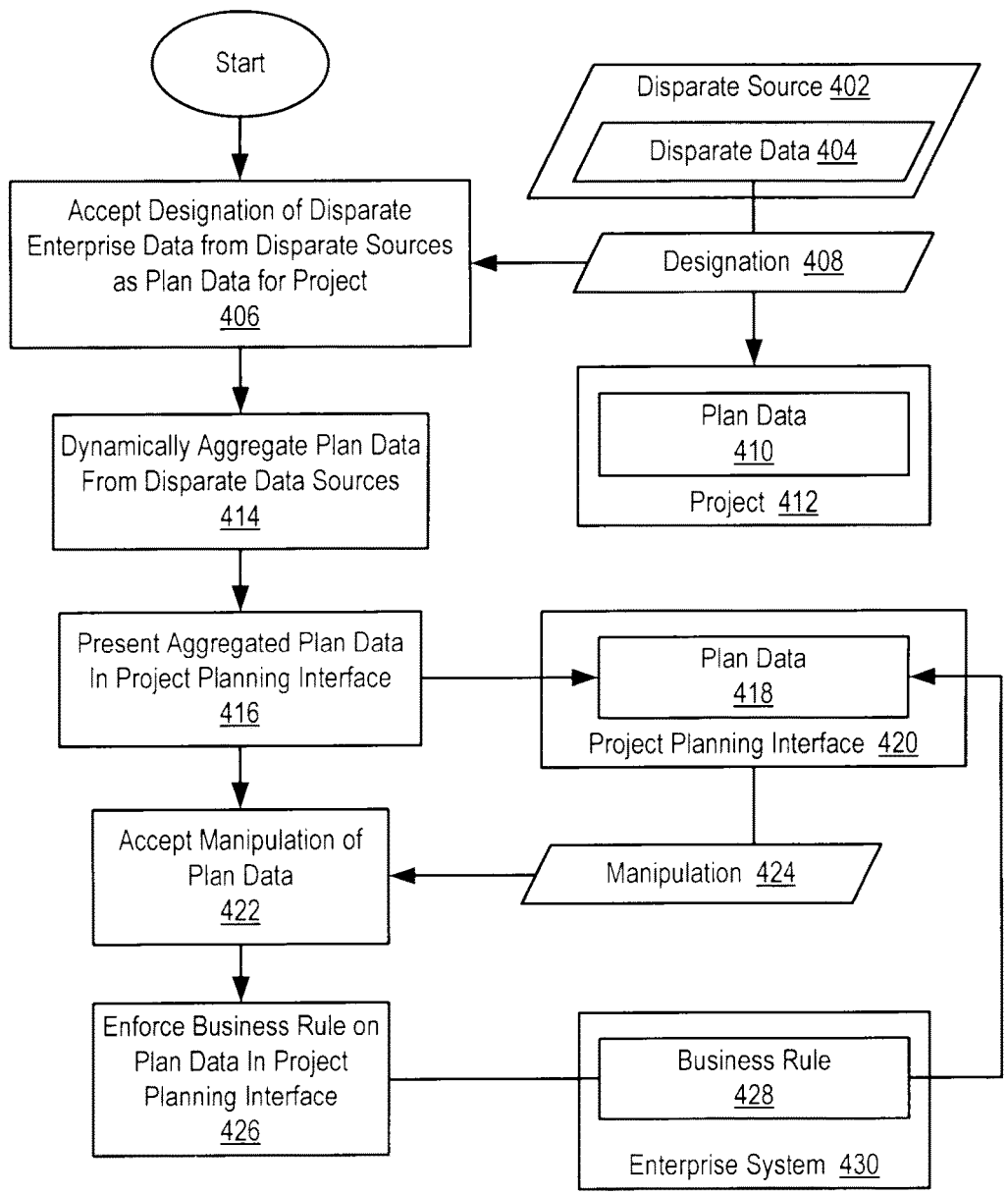
FIGS. 4 and 5 set forth a data flow diagrams illustrating methods for project management in accordance with embodiments of the invention.
Figure 5:
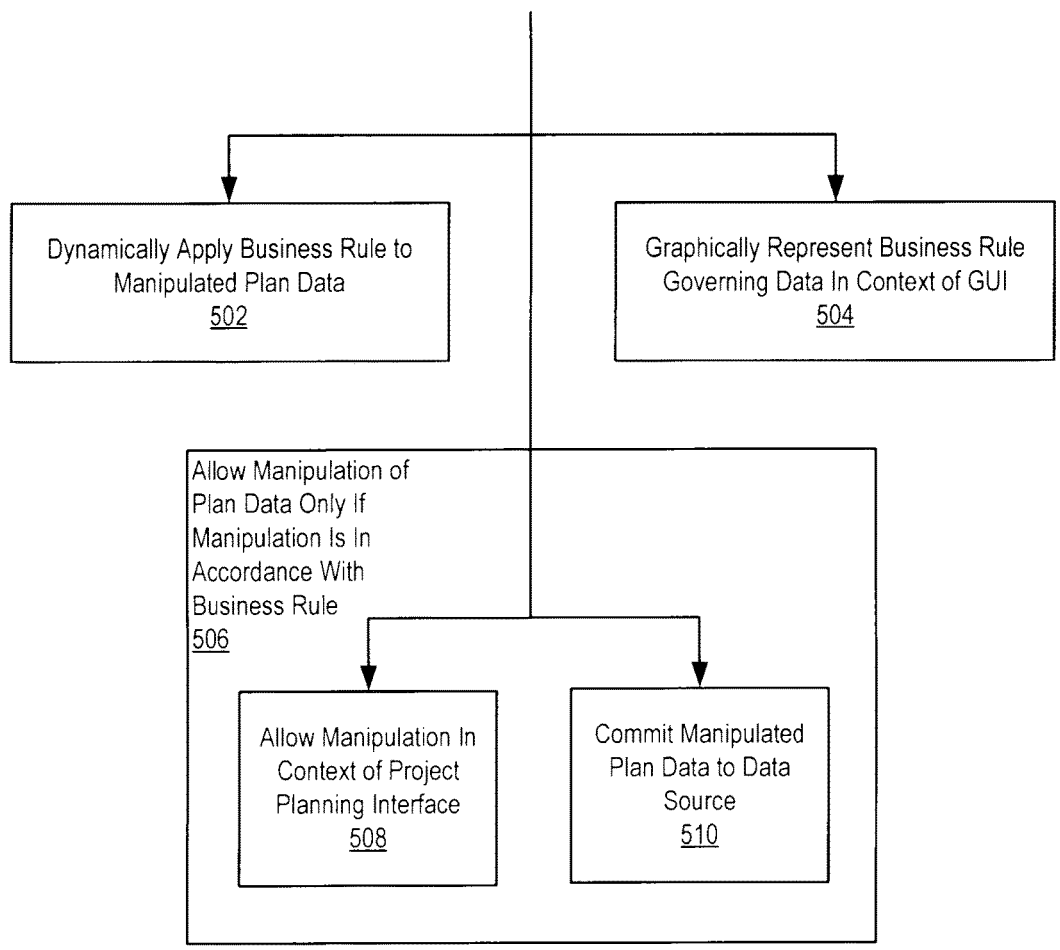

For further explanation, FIG. 4 sets forth a data flow diagram illustrating a method for project management in accordance with one embodiment of the invention. Referring to FIG. 4, the project management module 206 accepts a designation 408 of disparate enterprise data 404 from disparate sources 402 in an enterprise system 430 as plan data 410 for a project 412 (block 406). Accepting a designation 408 of disparate enterprise data 404 from disparate sources 402 in an enterprise system 430 as plan data 410 may be carried out by identifying data that needs to be planned, and defining the data sources based on presently existing data.

For example, a planner may identify the plan data 410 using a SQL query mechanism, so that the system loads the plan data 410 matching the queries into the intermediate data tables for the project 412. Loading the plan data 410 may include mechanisms to detect what has been changed, added, or deleted since the last time the schedule data was presented in the scheduler application.

The disparate enterprise data 404 is governed by a business rule 428 in the enterprise system 430. The business rule 428 is a rule to assert business structure or to manage the behavior of business processes and knowledge base management. The business rule 428 may include operations, definitions, constraints, derivations, relationships, attributes, and generalization structures. The business rule 428 may be implemented in the enterprise system 430 as business logic. Business logic may be a software or hardware implementation of constructs controlling information exchange between a database and a user interface.

The system dynamically aggregates the plan data 410 from the disparate data sources 402 (block 414). Aggregating plan data 410 may include retrieving plan data 410 from the disparate sources 402 and processing the plan data 410 for integration into a collective project planning interface. Aggregated plan data 418 is the accumulation, in a single location, of designated disparate enterprise data 404 from disparate sources 402. This location of the aggregated data may be either physical, such as, for example, on a single computer containing aggregated data; logical, such as, for example, in a single data record or memory structure (real or virtual); or functional, such as, for example, a single interface providing ready access to the aggregated plan data. Aggregating plan data 410 may vary according to the implementation of hardware embodiments, the storage configuration, and the format of communications for retrieving plan data. For example, dynamically aggregating the plan data 410 from the disparate data sources 402 (block 414) may include populating the data model as described above. For many relational database management systems, queries may be formulated using the Structured Query Language ('SQL'). For example, a planner may identify plan data 410 with a SQL query mechanism. The system loads the disparate data 404 that matches the queries into the project 412 as plan data 410.

Consider, for example, the following SQL query where clause.

wonum='1000'

When this where clause is applied to the datasource called workorder that represents the work details, it may represent a hierarchy of work details. For example, 1000 may represent the top-level node in a hierarchy. The system may be configured so that multiple chains of nodes in the hierarchy represented by the value '1000' may be retrieved using the SQL query where clause above, such as, for example, every node in the hierarchy. For example, maintenance for an aircraft may include maintenance on several subsystems, each of which includes hundreds or thousands of maintenanced parts. Maintenance on each part may be designated by a workorder. All of the workorders in a subsystem may be referenced by the subsystem workorder in the SQL query where clause. The aggregated data could potentially include not only the workorder identified by 1000, but also the entire hierarchy of the work.

The aggregation is dynamic because it is automatic and constantly refreshed. The system presents the aggregated plan data 418 in a project planning interface 420 (block 416). Whenever a planner views the plan in the project planning interface 420, the project planning interface 420 depicts the latest plan data 418 that matches the user's SQL queries. Presenting the aggregated plan data 418 in a project planning interface 420 (block 416) may include displaying lists, tables, icons, or any other element capable of graphical interface manipulation, or other graphical representations of the plan data 418 as will occur to those of skill in the art. Presenting the aggregated plan data 418 in a project planning interface 420 (block 416) may be carried out by displaying a user interface such as a command line interface or graphical user interface ('GUI').

The disparate data 404 in enterprise system 430 may be accessible in the enterprise system by users or groups with the appropriate access credentials. Users of the project management system may have authorization for only a subset of the disparate data that is designated by the project owner or administrator. Presenting the aggregated plan data 418 in a project management interface 420 (block 416) may include presenting a subset of the plan data corresponding to a subset of the disparate data according to authorization credentials enabling access to the subset of the disparate data. Thus, the authorization required to view the data is preserved in the project planning interface 420, so that the security of the disparate data is maintained in the project planning interface 420.

Project management module 208 accepts a manipulation 424 of the plan data 418 (block 422). Accepting the manipulation 424 of the plan data 418 (block 422) may include accepting input in the context of the user interface, determining the manipulation from the input, and modifying the plan data 418 in the intermediate data tables. Accepting the manipulation 424 of the plan data 418 (block 422) may be carried out by committing the manipulated plan data 118 in the intermediate data tables to the data source 402.

The system enforces the business rule 428 on the plan data 418 in the project planning interface 420 (block 426). Enforcing the business rule 428 on the plan data 418 in the project planning interface 420 (block 426) may include enforcing the business rule 428 upon the user manipulating the data from a visual interface.

Enforcing the business rule 428 on the plan data 418 in the project planning interface 420 (block 426) may include dynamically applying the business rule to the manipulated plan data (block 502). For example, a business rule may specify that if child task does not have any schedule dates (e.g., start and end times), schedule dates are derived from the parent task. Thus, upon creation of a child task in the project management interface 420 without filling in schedule dates, the project management interface 420 automatically copies the schedule dates, or links to the schedule dates (e.g., pointers, metadata, etc.), to the child task and reflects the schedule dates in the display of the child task in the project management interface 420. Other business rules may include using the current date as the default, using some other date, or other derivations that are known in the art.

Enforcing the business rule 428 on the plan data 418 in the project planning interface 420 (block 426) may include graphically representing the business rule governing the data in the context of the graphical user interface (block 504). Graphically representing the business rule governing the data in the context of the graphical user interface (block 504) may be carried out by depicting the business rule 428 by using graphical elements such as icons to represent the business rule 428. Graphically representing the business rule governing the data in the context of the graphical user interface (block 504) may be carried out by dynamically altering the graphical display in correlation with the business rule, including, for example, changing the color, intensity, or shape of icons or background elements, the use of animations, pop-ups, alerts, and so on.

Alternatively, graphically representing the business rule governing the data in the context of the graphical user interface (block 504) may include altering the rules of user interaction with the metaphor of the GUI to reflect the business rule 428, such as, for example, disallowing certain interactions within the metaphor of the GUI. For example, a business rule may specify that if the task is completed, the task depiction in the graphical user interface cannot be moved with respect to other graphical elements. Thus, the system alters the rules of user interaction of the graphical user interface to disallow movement of the task depiction.

Enforcing the business rule 428 on the plan data 418 in the project planning interface 420 (block 426) may include allowing the manipulation of the plan data only if the manipulation is in accordance with the business rule (block 506). For example, the business rule 428 may include constraints that require that particular tasks start on a specific day, cannot start in the last week of the month, cannot start or end on a weekend, and so on. If a user attempts to manipulate the plan data 418 so that any of these rules are violated, the project planning interface 420 may disallow the attempted manipulation. For example, the project planning interface 420 may undo the manipulation, dynamically change the manipulation to the closest allowable value, dynamically change the manipulation to a default value, provide a notification forcing the user to make another choice, and so on.

Allowing the manipulation of the plan data only if the manipulation is in accordance with the business rule (block 506) may include allowing the manipulation in the context of the project planning interface (block 508). Alternatively, allowing the manipulation of the plan data only if the manipulation is in accordance with the business rule (block 506) may include committing the manipulated plan data to the data source (block 510) if the manipulation is allowed. Committing the manipulated plan data to the data source (block 510) comprises using communications protocols to effect changes to the data source so that the data source mirrors the manipulated plan data 418.

Figure 6:
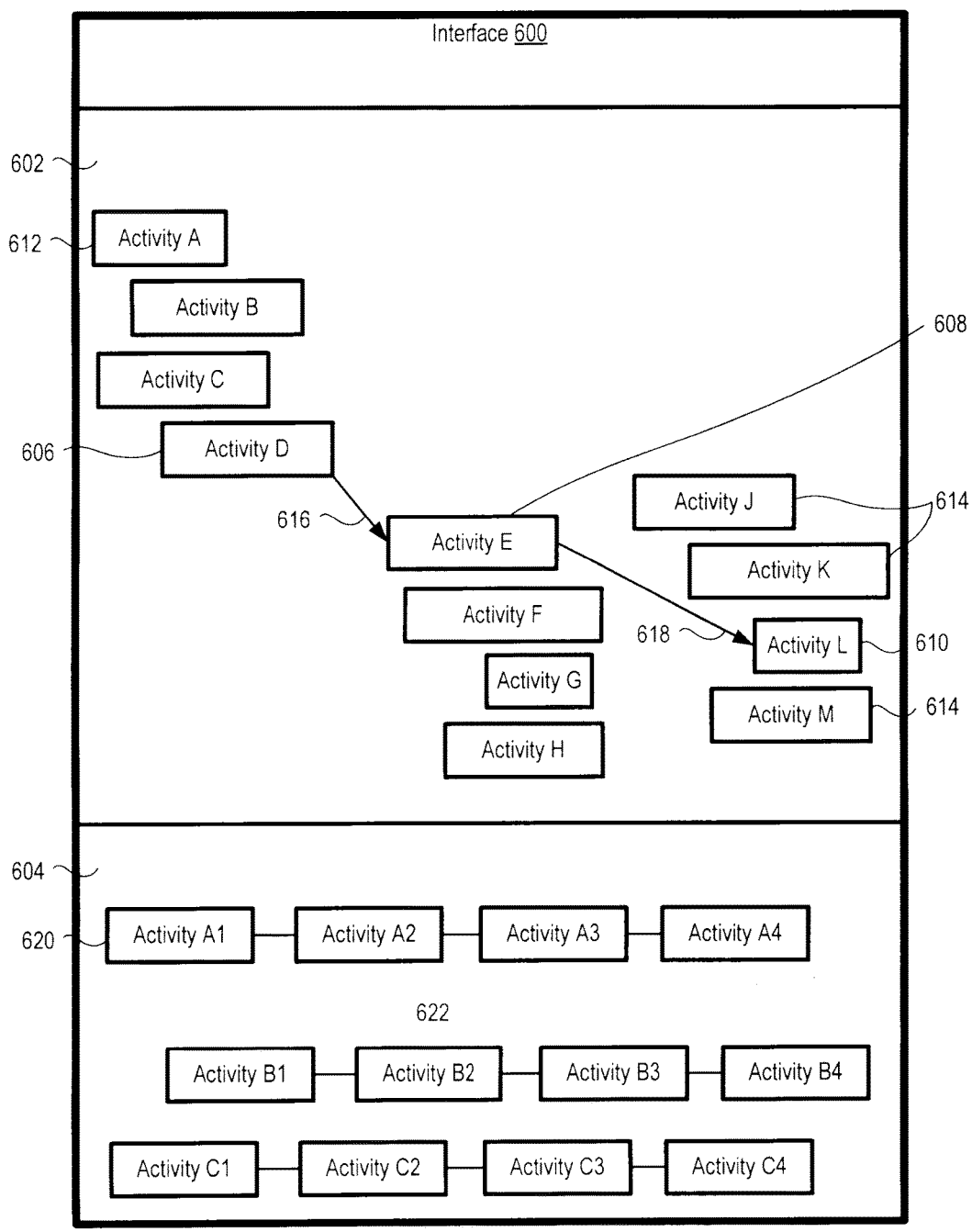
FIG. 6 illustrates a graphical user interface ('GUI') from a project management interface in accordance with embodiments of the present invention.

FIG. 6 illustrates a graphical user interface (GUI) 600 from a project management interface in accordance with embodiments of the present invention. The interface 600 includes a plan schedule including Gantt views of a graphic summary of work orders 602 and a graphic summary of preventive maintenance plans 604. Both the graphic summary of work orders 602 and the graphic summary of preventive maintenance plans 604 are a hierarchy of activities that the user may edit in the Gantt view.

The preventive maintenance work is scheduled in intervals represented as segments 620. Segments on a single row represent a single preventive maintenance plan 622. Work orders 606-614 are individual activities (performing a software test, etc.). Work orders 608 and 610 have precedence constraints, depicted as a precedence arrow 616, 618. Precedence arrow 616 illustrates that work order 608 cannot be started until work order 606 is completed. Precedence arrow 618 illustrates that work order 610 cannot be started until work order 608 is completed. In other implementations, other constraints or other types of business rules may apply to work orders. Also, it is possible in this single view to apply different business rules based on the data source and also perform different operations. For example, precedence arrows may be added by dragging from one work order to another. Double clicking on a work order may initiate a dialog box including text boxes containing work order information such as planned start and end times, project descriptions, craft and crew, and so on. These text boxes may be edited by the user in accordance with business rules. The GUI depicted in FIG. 6 is for illustration and not limitation. The project management interface may include any command interface or GUI for manipulation of project management data structures according to various views and visual control metaphors as will occur to those of skill in the art.

It should be understood that the inventive concepts disclosed herein are capable of many modifications. Such modifications may include combinations of hardware and software embodiments, specific project management functions, datasources, tables, and so on. To the extent such modifications fall within the scope of the appended claims and their equivalents, they are intended to be covered by this patent.

What is claimed is:

1. A computer-implemented method comprising:
   executing a project management system in one or more project management servers, wherein the project management system performs the steps of:
   initializing a scheduler application for creating one or more intermediate tables, wherein the one or more intermediate tables are created upon initializing a schedule for a project in a project planning interface that communicates with the project management system;
   automatically aggregating data from a plurality of disparate data sources identified by a plurality of queries and located on a plurality of organizational servers separate from the project management servers to populate the one or more intermediate tables used by the project in the project planning interface;

detecting a change in one or more of the plurality of disparate data sources located on the plurality of organizational servers, after an initial population of the one or more intermediate tables;

dynamically refreshing the aggregated data in the one or more intermediate tables from the one or more of the plurality of disparate data sources located on the plurality of organizational servers upon detecting the change in the one or more of the plurality of disparate data sources located on the plurality of organizational servers; and enabling access to a subset of the aggregated data in the one or more intermediate tables used by the project in the project planning interface in accordance with a user authorization credential.

2. The method according to claim 1, wherein the one or more intermediate tables are specific to the project.

3. The method according to claim 1, further comprising utilizing a query script to populate the one or more intermediate tables with matching data.

4. The method according to claim 1, wherein aggregating the data comprises:

retrieving the data from the plurality of disparate data sources; and processing the data for integration into the project planning interface.

5. The method according to claim 1, wherein the aggregated data is accumulated in a single location.

6. The method according to claim 5, wherein the location comprises a data record or a memory structure.

7. The method according to claim 5, wherein the location comprises a functional location.

8. The method of claim 4, further comprises presenting the subset of the aggregated data in the project planning interface.

9. A computer program product comprising a non-transitory computer readable storage medium having computer readable program code embodied therewith, the computer usable program code comprising:

computer readable program code for executing a project management system in one or more project management servers, wherein the project management system includes:

computer readable program code configured to initialize a scheduler application for creating one or more intermediate tables, wherein the one or more intermediate tables are created upon initializing a schedule for a project in a project planning interface that communicates with the project management system;

computer readable program code configured to automatically aggregate data from a plurality of disparate data sources identified by a plurality of queries and located on a plurality of organizational servers separate from the project management servers to populate the one or more intermediate tables used by the project in the project planning interface;

computer readable program code configured to detect a change in one or more of the plurality of disparate data sources located on the plurality of organizational servers, after an initial population of the one or more intermediate tables;

computer readable program code configured to dynamically refresh the aggregated data in the one or more intermediate tables from the plurality of disparate data sources located on the plurality of organizational servers upon detecting the change in the one or more of the plurality of disparate data sources located on the plurality of organizational servers; and computer readable program code configured to enable access to a subset of the aggregated data in the one or more intermediate tables used by the project in the project planning interface in accordance with a user authorization credential.

10. The computer program product according to claim 9, wherein the one or more intermediate tables are specific to the project.

11. The computer program product according to claim 9, further comprising computer readable program code configured to create a query script to populate the one or more intermediate tables with matching data.

12. The computer program product according to claim 9, wherein the computer readable program code configured to automatically aggregate data comprises:

computer readable program code configured to retrieve the data from the plurality of disparate data sources; and computer readable program code configured to process the data for integration into the project planning interface.

13. The computer program product according to claim 9, further comprising computer readable program code configured to accumulate the aggregated data in a single location.

14. The computer program product according to claim 13, wherein the location comprises a data record or a memory structure.

15. The computer program product according to claim 13, wherein the location comprises a functional location.

16. A system for project management, the system comprising:

a processor; and a computer memory operatively coupled to the processor, the computer memory having disposed within it:

computer readable program code for executing a project management system in one or more project management servers, wherein the project management system includes:

computer readable program code configured to initialize a scheduler application for creating one or more intermediate tables, wherein the one or more intermediate tables are created upon initializing a schedule for a project in a project planning interface that communicates with the project management system;

computer readable program code configured to automatically aggregate data from a plurality of disparate data sources identified by a plurality of queries and located on a plurality of organizational servers separate from the project management servers to populate the one or more intermediate tables used by the project in the project planning interface;

computer readable program code configured to detect a change in one or more of the plurality of disparate data sources located on the plurality of organizational servers, after an initial population of the one or more intermediate tables;

computer readable program code configured to dynamically refresh the aggregated data in the one or more intermediate tables from the plurality of disparate data sources located on the plurality of organizational servers upon detecting the change in the one or more of the plurality of disparate data sources located on the plurality of organizational servers; and computer readable program code configured to enable access to a subset of the aggregated data in the one or more intermediate tables used by the project in the project planning interface in accordance with a user authorization credential.

17. The system according to claim 16, wherein upon initializing the scheduler application, the project management servers retrieve the data from the plurality of disparate data sources located on the plurality of organizational servers.

* * * * *